US008043384B2

(12) United States Patent
Gagnon et al.

(10) Patent No.: US 8,043,384 B2
(45) Date of Patent: Oct. 25, 2011

(54) METHOD FOR MAKING FIRE RETARDANT MATERIALS AND RELATED PRODUCTS

(75) Inventors: Gerard A. Gagnon, Buckfield, ME (US); Richard W. Munson, South Bristol, ME (US); Daniel Harold Thompson, Jr., South Bristol, ME (US); Michael Thorne Kelly, Bath, ME (US); Robert A. Hupper, Madison, ME (US); Michael A. Bilodeau, Brewer, ME (US); Mark A. Paradis, Old Town, ME (US)

(73) Assignees: Green Comfort Safe, Inc., South Bristol, ME (US); University of Maine System Board of Trustees, Bangor, ME (US)

( * ) Notice: Subject to any disclaimer, the term of this patent is extended or adjusted under 35 U.S.C. 154(b) by 0 days.

(21) Appl. No.: 12/984,319

(22) Filed: Jan. 4, 2011

(65) Prior Publication Data

US 2011/0117354 A1 May 19, 2011

Related U.S. Application Data

(63) Continuation of application No. 12/910,534, filed on Oct. 22, 2010.

(60) Provisional application No. 61/254,114, filed on Oct. 22, 2009.

(51) Int. Cl.
*D06M 11/82* (2006.01)

(52) U.S. Cl. ......... 8/116.1; 8/115.51; 8/115.6; 252/601; 252/607

(58) Field of Classification Search .................. 8/115.51, 8/115.6, 116.1; 252/601, 607
See application file for complete search history.

(56) References Cited

U.S. PATENT DOCUMENTS

| 3,931,027 | A | 1/1976 | Sadler et al. |
| 4,055,203 | A | 10/1977 | Crawford et al. |
| 4,132,655 | A | 1/1979 | Draganov |
| 4,133,490 | A | 1/1979 | Jackson |
| 4,171,165 | A | 10/1979 | Card |
| 4,174,223 | A | 11/1979 | Steen |
| 4,182,681 | A | 1/1980 | Gumbert |
| 4,184,311 | A | 1/1980 | Rood |
| 4,184,969 | A | 1/1980 | Bhat |
| 4,191,224 | A | 3/1980 | Bontrager et al. |
| 4,228,964 | A | 10/1980 | Brady |
| 4,230,585 | A | 10/1980 | Bird et al. |
| 4,283,501 | A | 8/1981 | Brady et al. |
| 4,302,345 | A | 11/1981 | McCarter |
| 4,302,488 | A | 11/1981 | Lowi, Jr. |
| 4,342,669 | A | 8/1982 | Wilson et al. |
| 4,370,249 | A | 1/1983 | Bird et al. |
| 4,374,171 | A | 2/1983 | McCarter |
| 4,386,119 | A | 5/1983 | Draganov |
| 4,392,994 | A | 7/1983 | Wagener |
| 4,407,697 | A | 10/1983 | Sadler et al. |
| 4,412,659 | A | 11/1983 | Crawford et al. |
| 4,419,256 | A | 12/1983 | Loomis |
| 4,454,992 | A | 6/1984 | Draganov |
| 4,468,336 | A | 8/1984 | Smith |
| 4,487,365 | A | 12/1984 | Sperber |
| 4,514,326 | A | 4/1985 | Sallay |
| 4,530,468 | A | 7/1985 | Sperber |
| 4,572,815 | A | 2/1986 | Kaiser |
| 4,595,414 | A | 6/1986 | Shutt |
| 4,648,920 | A | 3/1987 | Sperber |
| 4,834,913 | A | 5/1989 | Aseltine et al. |
| 5,011,091 | A | 4/1991 | Kopecky |
| 5,352,780 | A | 10/1994 | Webb et al. |
| 5,368,929 | A | 11/1994 | Parker et al. |
| 5,379,568 | A | 1/1995 | Murray |
| 5,399,375 | A | 3/1995 | Rood |
| 5,455,065 | A | 10/1995 | Rood |
| 5,534,301 | A | 7/1996 | Shutt |
| 5,593,625 | A | 1/1997 | Riebel et al. |

(Continued)

FOREIGN PATENT DOCUMENTS

WO    WO 97/38164    * 10/1997

OTHER PUBLICATIONS

Statement of Richard W. Munson to Accompany Information Disclosure Statement, Jan. 25, 2011, 4 pp and accompanying compact disk with video referenced in the Statement.

*Primary Examiner* — Lorna M Douyon
*Assistant Examiner* — Amina Khan
(74) *Attorney, Agent, or Firm* — Verrill Dana, LLP; Chris A. Caseiro

(57) ABSTRACT

A method for making fire retardant material including fire retardant cellulosic insulation is described. The method includes an arrangement for adding one or more feedstocks and a fire retardancy chemical compound to a common blend tank prior to feedstock drying. The one or more feedstocks may include at least one virgin pulp stock feed and at least one recycled material stock feed. The amount and type of both the virgin feedstock and the recycled material feedstock is selectable. Old newsprint (ONP) may be one type of recycled material feedstock. Another suitable type of recycled material feedstock is old corrugated containers (OCC). The method further includes retaining the fiber feedstock and the chemical compound together for enough time to ensure adherence or impregnations of enough of the chemical to the fibers after the drying process. Fluffing or fiberizing of the treated fibers may be accomplished under less severe conditions than ordinarily employed when making conventional cellulose insulation.

17 Claims, 2 Drawing Sheets

U.S. PATENT DOCUMENTS

| | | |
|---|---|---|
| 5,635,123 A | 6/1997 | Riebel et al. |
| 5,683,810 A | 11/1997 | Babbitt et al. |
| 5,910,367 A * | 6/1999 | Kean et al. ............ 428/393 |
| 6,025,027 A | 2/2000 | Shutt |
| 6,045,298 A | 4/2000 | Lytle |
| 6,113,990 A | 9/2000 | Killingsworth |
| 6,155,020 A | 12/2000 | Deem |
| 6,276,619 B1 | 8/2001 | Turk et al. |
| 6,394,371 B1 | 5/2002 | Ribardi |
| 6,578,782 B2 | 6/2003 | Elliot, Jr. et al. |
| 6,620,349 B1 | 9/2003 | Lopez |
| 6,641,749 B2 | 11/2003 | Rood |
| 6,641,750 B2 | 11/2003 | Rood |
| 6,660,190 B2 | 12/2003 | Huhn |
| 6,723,352 B2 | 4/2004 | Bosserman |
| 6,786,437 B2 | 9/2004 | Ribardi |
| 6,902,788 B2 | 6/2005 | Suzuki |
| 6,964,744 B2 | 11/2005 | Gallagher et al. |
| 6,980,076 B1 | 12/2005 | Rolling et al. |
| 7,279,073 B2 * | 10/2007 | Bowman et al. ............ 162/261 |
| 7,291,465 B2 | 11/2007 | Karaolis |
| 7,435,705 B2 | 10/2008 | Haenke |
| 7,448,494 B2 | 11/2008 | LaSalle |
| 7,449,125 B2 | 11/2008 | Church et al. |
| 7,449,130 B2 | 11/2008 | Lloyd et al. |
| 2007/0137805 A1 * | 6/2007 | Gerber et al. ............ 162/4 |

* cited by examiner

METHOD FOR MAKING FIRE RETARDANT MATERIALS AND RELATED PRODUCTS

CROSS-REFERENCE TO RELATED APPLICATION

The present application is a continuation, and claims the priority benefit, of U.S. patent application Ser. No. 12/910,534, entitled "METHOD FOR MAKING FIRE RETARDANT MATERIALS AND RELATED PRODUCTS" filed Oct. 22, 2010, which relates to, and claims priority in, U.S. Provisional Patent Application Ser. No. 61/254,114, entitled "METHOD FOR MAKING CELLULOSIC INSULATION" filed Oct. 22, 2009, by the same inventors. The contents of the related applications are incorporated herein by reference.

BACKGROUND OF THE INVENTION

1. Field of the Invention

The present invention relates to making fire retardant materials. More particularly, the present invention relates to making fire retardant insulation. Still more particularly, the present invention relates to insulation made with cellulosic material. Further, the present invention relates to a method of making cellulosic insulation using a combination of virgin wood fiber feedstock and/or de-inked and/or re-pulped recycled feedstock.

2. Description of the Prior Art

Insulation is widely used for the purpose of passive thermal control in a broad range of applications, with building insulation being a particularly substantial application. Inorganic fiberglass has been the most common type of material used to make insulation. Fiberglass insulation is provided in blanket and blown fiber form, with the thickness of the blanket or the blown fiber fill determinative of insulative effectiveness.

Concerns over the in-situ (installed) effective performance of fiberglass as well as the product's limited fire retardant characteristics and environmental characteristics, which are now regulated under the Federal National Toxicological standards, have raised public and governmental concerns over its continued use as a thermal insulation product. Organic cellulosic insulation has been considered as one type of alternative to fiberglass and can be desirable for that purpose, particularly in regard to its environmental suitability and thermal efficiency. Currently, cellulosic insulation is made from recycled feedstock, with recycled newsprint being the primary feedstock. Other types of materials have been considered in order to increase the volume of available feedstock, such as cardboard, wood construction debris and the like.

Cellulose insulation is made in part using existing papermaking machinery and methods. Specifically, cellulose feedstock in the form of used paper, ordinarily in the form of printed newspaper, is ground or otherwise mechanically made into small pieces. In order to ensure that the cellulosic insulation conforms to fire retardant standards, the pieces are mixed and mashed together with a fire retardant chemical, which is usually a boron-based chemical in powder (i.e., solid) form that is not particularly effective at adhering to cellulose fibers. The chemical used tends to be either boric acid or borax, or an amalgamation of the two (which will be referred to herein as borate). The treated pieces may then optionally be fluffed to reduce its overall bulk density and improve its suitability for application.

Cellulosic insulation has not been widely adopted as a suitable alternative to fiberglass insulation for several reasons. First, the cost of the fabrication method mentioned above is too high to make it economically competitive. Second, the conventional recycled material used as feedstock is not adequate to produce enough material to meet market demand as a replacement for fiberglass. In addition, the method of converting various types of recycled feedstock can significantly affect the processing cost. Third, the method of joining the fire retardant material to the cellulose pieces requires the use of a considerable amount of the treatment material, in the case of powdered treatment material, such as the most commonly used pulverized borate, and the poor adhesion between the two materials.

U.S. Pat. Nos. 5,534,301 and 6,025,027 to Shutt and U.S. Pat. Nos. 4,386,119 and 4,454,992 to Draganov describe the use of liquid borate as a means to reduce the amount of borate needed to cover cellulose insulation fibers. However, the processes described in those patents involve the application of the liquid borate to the fibers after they have been substantially manufactured, including through the dewatering stage. This method is of limited commercial value and may not adequately address the difficulty in joining the fire retardant chemical to the fibers.

Therefore, what is needed is a system and related method for making cellulosic insulation in a cost competitive way. What is also needed is such a system and related method that can be used with new feedstocks instead of or in addition to, conventional material (specifically, recycled newsprint). Further, what is needed is a system and related method to improve the fire retardant application method and fire retardant material retention on or in the cellulosic material.

SUMMARY OF THE INVENTION

It is an object of the present invention to provide a system and related method to make fire retardant material, including fire retardant organic cellulosic insulation, in a cost competitive way. It is also an object of the invention to provide such a system and related method that can be used with a significantly broader range of feedstocks inclusive of recycled materials. Another object of the invention is to provide such a system and related method that improves the fire retardant application method and fire retardant material retention on or in the feedstock material.

These and other objects are achieved with the present invention, which is a system and related method for making cellulosic insulation. The feedstock may be an inorganic material but may also be an organic material, which organic material may be preferable to avoid limitations and possible safety concerns associated with inorganic material. The system includes an arrangement for providing one or more feedstocks, including, optionally, at least one virgin pulp stock feed and at least one recycled material stock feed, which are combined in a common blend tank. The amount and type of both the virgin feedstock and the recycled material feedstock is selectable. It is to be noted that the virgin feedstock may be used to make up the amount of pulp required to fill insulation orders dependent upon the availability of recycled material feedstock. Old newsprint (ONP) may be one type of recycled material feedstock. Another suitable type of recycled material feedstock is old corrugated containers (OCC). The invention is not limited to just these two types of recycled material feedstock and may include the use of a single feedstock of either type or any other type, provided its characteristics are accounted for in the process of combining it with a fire retardancy chemical. The blend tank includes a liquid, such as water but not limited thereto, with the ratio of liquid to solids by weight being as much as 90/10 but not limited thereto.

The system also includes a chemical treatment source with an input component. The chemical treatment source includes a liquid or suspension of treatment material, which may be a combination of a fire retardancy chemical, such as a borate or other suitable compound, water, and any other additives that may be of interest. While a borate such as boric acid, borax, or a combination of the two may be used as the fire retardancy chemical, it is to be understood that other suitable fire retardancy chemicals may be employed. An aspect of the invention is that the fire retardancy chemical is combined with the feedstock in a liquid form rather than a solid form so as to provide effective attachment of the fire retardancy chemical to the surface of or into the basic structure of the feedstock component.

Another additive that may be of interest and used in the feedstock treatment process is a chemical, biological or other additive to eliminate or reduce one or more components of the feedstock that may result in a product with undesirable characteristics. For example, a cellulosic feedstock that is a recycled material may include one or more bonding agents comprising polysaccharides, starches and the like that, if carried through to the end product, may facilitate mold growth. An additive such as an enzyme or other component to break down such undesirable components, and/or make them sufficiently fluidized that they can be removed from the treated feedstock, may be added to the blend tank as an aspect of the present invention. The addition of the enzyme with the fire retardancy chemicals enhances effective attachment of the fire retardancy chemical to the surface of or into the basic structure of the feedstock component.

The chemical treatment source is combined with the plurality of feedstocks at one or more selectable stages of the cellulose insulation fabrication method prior to final drying of the cellulose material in fiber form. For example, the input component for the chemical treatment source may be coupled to the blend tank for introduction of the chemical treatment at that point of the method. However, it is to be understood that the input component for the chemical treatment source may be located elsewhere, including other system component locations where the liquid to solids ratio is different from 90/10.

The system of the present invention further includes conventional components including, but not limited to, one or more dewatering devices, one or more water recovery and return devices, optional fiber dye and/or bleaching devices, one or more dryers, dust collectors, coolers, fiberizers, product collectors and all conduits required to transfer material among the devices of the system. The system may be substantially incorporated into a conventional pulp and fiber manufacturing process of the type typically used in the papermaking industry, for example, rather than a completely distinct or an extensive add-on to a conventional process. An example of particular components of the system will be described herein, a number of which exist in the conventional pulp/paper processing facilities that currently exist. The introduction of the chemical treatment to the pulp prior to fiber drying yields a reduction in chemical treatment costs and overall insulation processing costs.

The system and related method of the present invention provide an effective and cost competitive way to manufacture a viable cellulose insulation product. The system and method include the use of a combination of feedstocks, including virgin feedstocks, to ensure an adequate and sustainable supply of feedstock. The system and method also include the introduction of the chemical treatment prior to a drying stage, if any, of the manufacturing process. This results in a more effective attachment or impregnations of the fire retardant chemical with the insulation fibers while also reducing the amount of treatment to be used to produce effective fire retardancy. Further, if the fire retardancy chemical employed is a borate, a combination of borax and boric acid in the liquid form, whether solubilized in the blend tank or solubilized prior to adding to the blend tank, has been found to be effective, rather than either alone. In particular, the combination of the two enhances the solubility of both such that more fire retardancy chemical may be applied to the feedstock than is possible when one of the two is used alone. That is, when relatively higher fire retardancy chemical concentrations are attempted with either borax or boric acid alone, the chemical tends to precipitate and, therefore, a limited amount may be joined to the feedstock material. The combination, on the other hand, improves solubility and, therefore, application to the feedstock. In addition, there can be a cost saving through the use of borax to replace some of the boric acid.

The present invention enables the manufacture of fire retardant materials. The feedstock used to make the fire retardant material may be of any type not limited to specific paper, pulp, container or other form of material. The invention provides for the combining of a fire retardancy chemical with the feedstock prior to drying of the combination. The fire retardancy chemical is in liquid form when combined with the feedstock. The combination of fire retardancy chemical and the feedstock may be further processed to form a web, a sheet, a plurality of fibers, or other suitable form. The feedstock and fire retardancy combination may be further processed to make insulation, as noted, or other end products wherein fire retardancy is a desirable feature.

These and other advantages of the invention will become more apparent upon review of the following detailed description, the accompanying drawings and the appended claims.

DETAILED DESCRIPTION OF THE PREFERRED EMBODIMENT OF THE INVENTION

While the follow description is directed to the embodiment of the invention wherein an organic cellulosic insulation is made, it is to be understood that the invention is not limited thereto. Instead, the present invention provides for the effective application of a fire retardancy chemical in liquid form to or in a feedstock material in a cost effective way prior to drying of the combination of the two. Additionally, the present invention provides for the combining of two fire retardancy chemicals to improve the solubility of both for a desired increase in concentration of the fire retardancy chemical applicable to the feedstock material.

Figure 1:
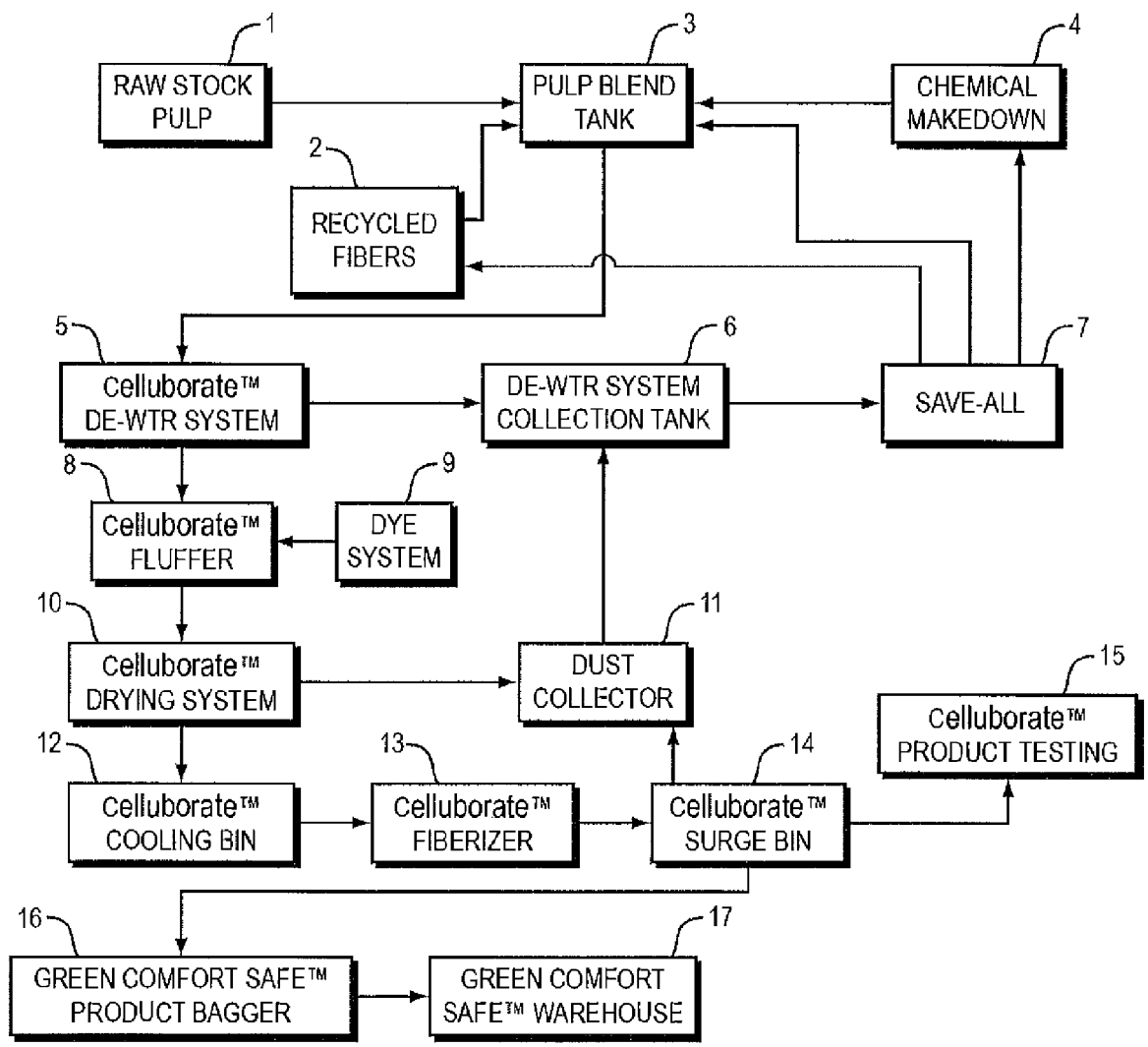
FIG. 1 is a simplified block diagram representation of the method stages and the system components associated with the manufacture of the cellulose insulation of the present invention.
Figure 2:
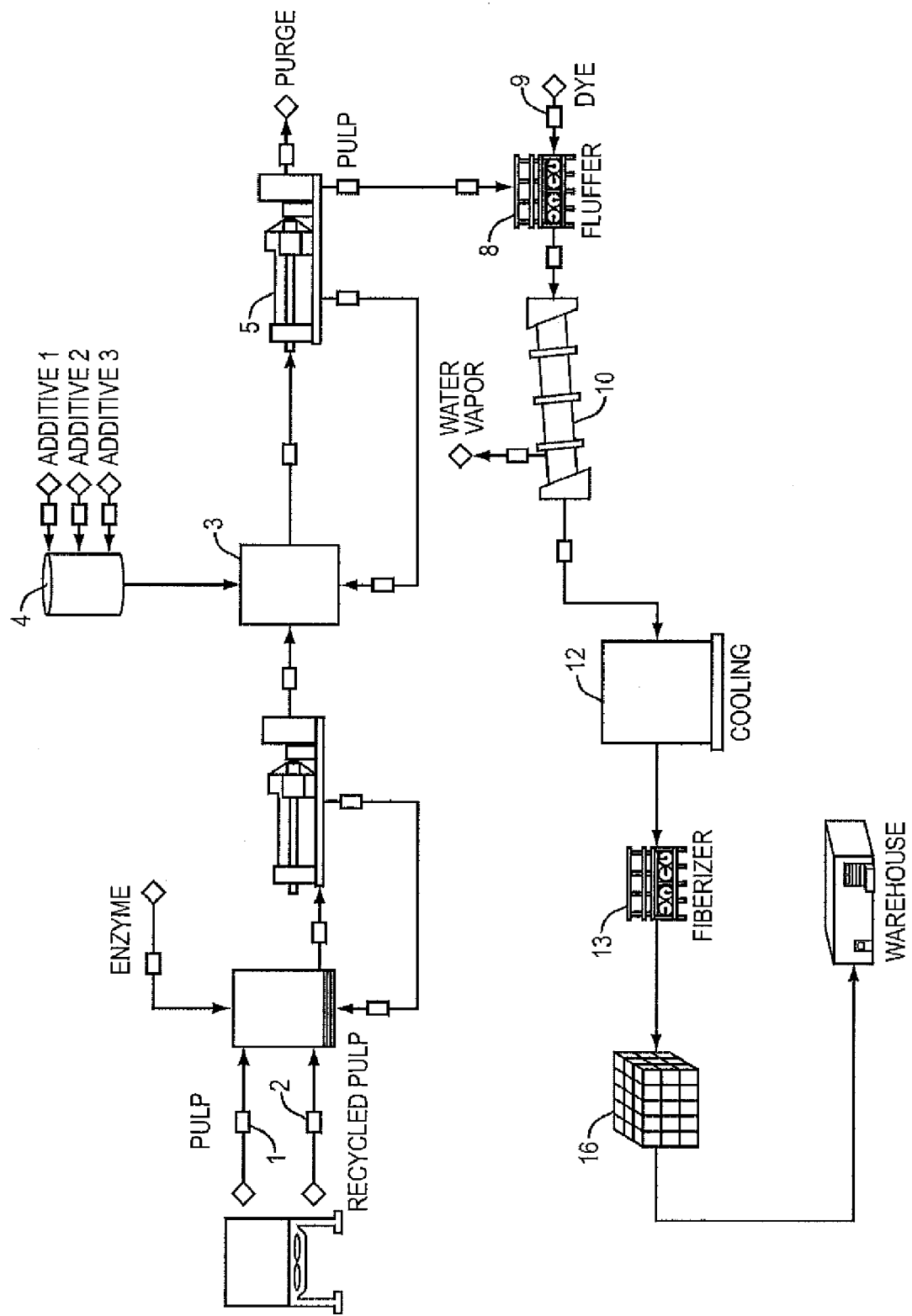
FIG. 2 is a simplified diagram representation of example system components associated with the manufacture of the cellulose insulation of the present invention.

Referring generally to FIGS. 1 and 2, a cellulose insulation of the present invention referred to herein as Celluborate is a new fiber that is created when pulp fibers (raw stock 1) from a kraft or groundwood (stone or thermo-mechanical) pulp mill are interspersed with recycled material, such as newsprint (ONP 2) or OCC, at a 1% to 50% ratio by weight, in a blend tank 3 at a 1% to 30% solids level by weight. In an alternative embodiment, the feedstock may be entirely provided by recycled material such as the OCC or ONP, for example. Water in the tank 3 has dissolved chemicals (fire retardancy chemicals such as borates, for example) that, when absorbed by or adhere to the fibers, makes the fibers fire retardant. The chemical saturation and dwell time in the tank 3 is selectable to ensure that the pulp fibers of the finished cellulose insulation contain the proper amount of borates adhered thereto. A component to hydrolyze starch, polysaccharide, or other undesirable material, may also be added to the tank 3 as needed to make a suitable end product. The fibers are then dewatered and dried in such a way as to keep their bulk and for the fibers to be considered "fluffed" as that term is understood in the fibrous and/or insulation products industries. The amount of chemical remaining in and on the fiber after drying will determine its ability to be flame retardant. The fibers made using the method of the present invention can be used as a fire retardant, thermal, sound and radiant barrier material for insulating.

The Celluborate fiber manufacturing method involves the option to divert raw fiber from a source such as a pulp mill of the conventional paper making process for its feedstock. The Celluborate manufacturing system of the present invention includes equipment to dry and fiberize the material. Traditional fiberizers used to make prior cellulose insulation with fire retardancy mix the chemical and fiber in a high velocity grinding motion with the intent to press chemicals onto the fibers and to create surface area by a typical refining action. The Celluborate method of the present invention takes the fibers with the absorbed chemicals and dries them individually, keeping them in a "fluffed" state which creates the maximum amount of surface area that will increase settled density characteristics and thereby provide effective insulation characteristics.

With continuing reference to FIGS. 1 and 2, the raw stock pulp supply 1 can be hardwood (1.5 mm), softwood (3.5 mm) (kraft process) or groundwood (<1 mm) (includes stone, thermo-mechanical process) cellulose pulp fibers, which may be diverted from the conventional cellulose processing system prior to the bleaching stage, or immediately afterward if that is of interest. These fibers should be dewatered as much as possible. Pulp coming off the last black liquor washer in a kraft process, for example, before going into the bleaching process is preferable (20% solid by weight). A pump is required to move pulp to the blend tank 3.

Recycled newsprint pulp supply 2 may be obtained from a conventional paper recycle process, such as from ONP #8 and #9 sources, for example. The paper can be introduced into a repulper. A repulper is a tank that has an agitator and a source of water to pulp the paper. The agitation separates the fibers from each other. Repulping should be done at the highest solids level possible. A pump is required to move the pulp to the blend tank 3. Those of skill in the art will recognize that any sort of pump used to move pulped material from one location to another may be employed for this purpose.

As indicated, the blend tank 3 receives pulp from the raw stock supply 1 and the recycled paper supply 2, and may be supplied by other cellulose sources if that is of interest. The tank 3 can be filled with flow control valves to any desired ratio of raw stock to recycled newsprint. Liquid fire retardant chemicals from a chemical make down source 4 may be added at this stage of the process and mixed with the blending pulp through a funnel cone into the tank and the use of an agitator. After the required dwell time is achieved, preferably more than 1 minute, the Celluborate fibers can be discharged from the bottom of the tank 3 with a pump to a dewatering system 5.

The chemical make down system 4 is configured to prepare chemicals of interest to be applied to the fibers and mixes them in the desired ratios with water. Depending on the type of bulk system used to receive chemicals, the make down unit 4 introduces chemicals and water with an agitator inside of a small vessel used for mixing. This mixture can then be pumped to a funnel cone on top of the blend tank 3.

The dewatering system 5 is selected from any number of existing systems that takes a cellulose pulp slurry and removes water to a desired solids content. Generally speaking, the more water removed using this system the better, although there may be a water content of the slurry that is determined to be the most effective time at which to insert the treatment chemicals from the chemical make down system 4. Heat energy will be required to remove the remaining water. Any type of screw press, twin wire press, vacuum filter, plate and frame press, roll press, centrifugal drum or any other type of dewatering system 5 that can increase the solids above 50% is preferable.

The dewatering system 5 is preferably coupled to a dewatering system collection tank 6, which is used to collect water from the dewatering system 5 and from a dust collector 11. This captures any fiber fines and chemicals that have been drained off during the dewatering stage. A pump can transfer this water to a reservoir referred to herein as a save-all 7 for further processing.

The save-all 7 receives fluid from the dewatering system collection tank 6 and separates fibers from the water. This can be accomplished by a flotation, rotary (vacuum filters) or wire (fabric) system that can efficiently remove the water. The fibers can be transported to the blend tank 3 to be added back to the system. The residual water can be reused in the ONP repulper and/or in the chemical make down system 4. Excess water can be filtered for use in other process components of the system or put into a waste treatment process for removal.

A Celluborate fluffer 8 coupled to the dewatering system 5 takes the dewatered pulp in the form of a pulp cake that is now in a 30 to 60% solid state and breaks the pulp cake up. The fluffer 8 can be two counter rotating meshed blades with a discharge to a drying system 10. Any number of fluffers can be used to break up the pulp cake. Depending on the type of fluffer used, an optional dye injection/spray system 9 can be employed to change the color of the fibers and have them fixed in before the drying process. The dye system 9 can be used to change the color of the resulting fibers for a variety of marketing reasons and at a customer's request.

The drying system 10 is used to dry the fibers down to a desired moisture content, such as an 86% solid form (14% moisture), for example, but not limited thereto. An energy source is required to force the remaining moisture to evaporate. The exhaust and dust from the drying system 10 can be tied into the dewatering system collection tank 6. A rotary drum dryer or flash dryer system that breaks up and fluffs the pulp while drying is suitable. A belt conveyor, auger system or other form of conveyance device may be used to transport the dried and chemically treated fibers to a cooling bin 12. An exhaust gas/hot air collection system from the dryer system may be employed to take moist air and recirculate it back through the drying system 10 to capture residual heat before exhausting to the atmosphere.

The dust collector 11 receives moisture laden air and dust from the drying system 10 as well as dust from a surge bin 14. This combination of moisture laden dust is then introduced into the dewatering system collection tank 6. The cooling bin 12 is configured to allow the fibers to cool down before the next stages and to be a holding bin before further processing. Fibers can be collected at this stage and tested to determine if further processes are required. Through a screw auger, air conveyor or other form of conveyance device, the fibers can be transported to the surge bin 14 if nothing is further required to finish the product. If further work is needed then they can be discharged through a screw auger, air conveyor or other type of conveyance device to a fiberizer 13.

The fiberizer 13 may optionally be used to further refine the fiber material to establish product characteristics considered suitable based on the test and regulatory requirements expected for this type of product. For example, the fiberizer 13 may be used to reduce the lengths of the fibers if that is of interest, or to reduce the bulk density of the product. The fiberizer 13 may further be adapted to introduce more fire retardant chemical and manipulate the fibers for better settled density. The finished product is then transferred to the surge bin 14. The fiberizer 13 can be a mechanical device with rotating elements in close proximity to one or more sets of static or counter rotating elements such that when clumps of fibers are conveyed through the device they are subjected to shear forces which disperse the fibers into a lower bulk density material. A hammer mill is an example of a fiberizer.

The surge bin 14 is preferably configured to hold a quantity of material to keep the bagging system in a continuous operating mode. Fibers can also be sent to for testing and any residual air collected and transported to the dust collector 11. Testing may be performed on the fibrous material that is the cellulose insulation of the present invention for compliance with all regulations concerning blown-in cellulosic fiber insulation as directed by the C-739, HH I515, and the Consumer Product Safety Council. Testing may be performed to determine compliance with that specification's recommendations regarding pH, settled density, critical radiant flux and smoldering combustion rating of the insulation.

Once all processing and any testing has been completed, the finished product may be conveyed to a product bagger system 16 for the purpose of organizing predetermined quantities of material and putting them into a container, such as a bag, weigh the bag for accuracy, stack and stage the bags on pallets for removal to a warehouse 17.

Examples of the product of the present invention were made using the method of the present invention as described herein. The example products were made at the University of Maine's Process Development Center. They were each tested for pH, settled density, critical radiant flux and smoldering combustion rating. Odor was also observed and reported on. There were a total of six compositions of the product made, each with a different fire retardant chemical compound transferred from the chemical makedown tank 4 to the pulp blend tank 3. Additionally, a commercial cellulose insulation product, GreenFiber Blow-in Natural Fiber Insulation, from the GreenFiber Company of Charlotte, N.C., was tested to determine the effectiveness of the method of the present invention in making a product similar to a commercially available product. The GreenFiber product tested was described by its supplier as including 15% by weight of flame retardant chemicals, stated to be a combination of boric acid and ammonium sulfate in an undisclosed ratio.

The six example versions of the invention had in common that they were first prepared by slushing OCC in a Black Clawson repulper with a bottom agitator at approximately 4% consistency. The component shown in FIG. 2 where Enzyme, Pulp and Recycled Pulp are added is such a repulper tank. Also as shown, an optional second dewatering system was employed to dewater the enzyme-treated pulp prior to entering the blend tank 3. An amylase enzyme (Nalco 62801) was added to the pulp slurry in the repulper and held for one hour at 120° F. to hydrolyze the polysaccharides and starches present in the OCC feedstock. Other forms of hydrolyzing components may be used and different dwell times and operational temperatures may be employed for other types of feedstock materials requiring such components without deviating from the present invention. Further, some feedstock types may require no such hydrolyzing components. The pulp was then transferred to a pilot papermaking machine to produce rolls of paper web at a nominal 5% moisture content. The fire retardant chemical compound, different for each example, was applied to the paper web using a size press, a conventional two roll coater used to apply coating onto both sides of a web simultaneously, which was located after the dryer section of the pilot papermaking machine. Additionally, example compositions for which the concentration of the fire retardant chemical compound exceeded 22% by weight, additional solution including the chemical compound was also applied to the paper web using a separate web coater. The web coater is of similar design to conventional commercial coaters used to apply aqueous coatings or adhesives to the surfaces of webs, including paper, foils or fabric. The Faustel "Plug and Play" web coater used in this example is designed and used for this purpose. Finally, the paper web treated with the chemical compound was dried and formed into pieces. The examples were made to determine the effectiveness of the chemical compounds employed and the timing of their introduction to the pulped material prior to drying. The drying and fluffing and/or fiberizing were simply performed with a conventional hammer mill after addition of the fire retardant chemical compound. The resultant example products provided sufficient information regarding the viability of the method described herein, particularly in regard to the chemical compound options and where the chemical compound is introduced in the process.

Of the six example products made for testing, three involved the addition of a blend of Borax and boric acid (referred to herein by the trade name Polybor™ available from US Borax) to the paper web, and three involved the addition of boric acid to the paper web. The concentrations of the chemical compound differed for each of the sets of three, as indicated in Table 1. Table 1 shows the C-739, HH I515 standards for settled density in $kg/m^3$ and $lbs/ft^3$, pH, critical radiant flux (an indication of fire retardancy) and smoldering weight loss (also an indication of fire retardancy). Those data for each of the six example products of the present invention and the commercially available GreenFiber cellulose insulation material are presented.

TABLE 1

Test Results of Cellulose Insulation

| Units | Settled Density | | pH | C.R.F | Odor | Smoldering wt loss |
|---|---|---|---|---|---|---|
| | Kg/m3 | pcf | | | | |
| Specification | | | 7.2-7.8 | >0.12 | subjective | <15% |
| | ID (wt % chemical) | | | | | |
| Commerical sample (Green Fiber) (15%) | 34.65 | 2.16 | 7.7 | 0.32 | pass | 0.10% |
| Polybor 22.8% | 99.6 | 6.21 | 8.4 | 0.72 | pass | 0.10% |
| Polybor 18% | 55.8 | 3.48 | 8.4 | 0.46 | pass | 0.10% |
| Polybor 9.4% | 42.3 | 3.26 | 8.2 | 0.31 | pass | 0.10% |
| Boric acid 17.9% | 37.3 | 2.32 | 7 | 0.15 | pass | 0.10% |
| Boric acid 12.5% | 33.4 | 2.08 | 7.2 | 0.12 | pass | 0.10% |
| Boric acid 10% | 31.1 | 1.94 | 7.3 | 0 | pass | 0.10% |

A review of Table 1 shows that all six examples of the product made by the present invention meet the critical fire retardancy targets established by the specification (as does the commercially available product). Additionally, the product made using Polybor as the chemical compound at 9.4% by weight of the composition is comparable to the commercial GreenFiber product. While its pH can be adjusted effectively by addition of an acid, it is to be noted that it requires substantially less (about 37% less) of the fire retardant chemical compound than does the GreenFiber product in order to achieve substantially the same fire retardancy characteristics. It is desirable to achieve suitable fire retardancy characteristics with less chemical addition.

The present invention of a method for providing an improved fire retardant material and, in particular, a cellulose insulation fabrication and the cellulose insulation made thereby, have been described with respect to specific components and method steps. Nevertheless, it is to be understood that various modifications may be made without departing from the spirit and scope of the invention. All equivalents are deemed to fall within the scope of this description of the invention as identified by the following claims.

What is claimed is:

1. A method for making fire retardant fibers comprising the steps of:
   a. introducing one or more fiber feedstocks to a blend tank, wherein each of the one or more fiber feedstocks has a basic structure, and wherein at least one of the one or more fiber feedstocks includes a bonding agent;
   b. adding a fire retardant chemical to the blend tank, wherein the fire retardant chemical is a combination of boric acid and borax in liquid form selected to improve the solubility of each of the boric acid and the borax and thereby provide effective attachment of the boric acid and the borax on and into the basic structure of the one or more fiber feedstocks;
   c. retaining the one or more fiber feedstocks and the chemical in the blend tank for a period of time sufficient to provide effective attachment of the boric acid and the borax on and into the basic structure of the one or more fiber feedstocks;
   d. then drying the fibers of the one or more fiber feedstocks to form a chemically treated pulp cake; and
   e. fluffing the pulp cake to form the fire retardant fibers.

2. The method of claim 1 further comprising the step of fiberizing the fire retardant fibers after the fluffing step.

3. The method of claim 1 wherein the fluffing step is performed by introducing the pulp cake to a pair of counter rotating meshed blades to break up the pulp cake into the fire retardant fibers.

4. The method of claim 1 wherein the one or more fiber feedstocks includes a virgin pulp feedstock and one or more recycled material feedstocks.

5. The method of claim 4 wherein there is only one recycled material feedstock and it is old newsprint.

6. The method of claim 5 wherein the ratio of virgin pulp feedstock to old newsprint is in the range of 1% to 50% by weight.

7. The method of claim 1 wherein the fiber feedstock is old corrugated container.

8. The method of claim 1 wherein the combination of borax and boric acid is about 9.4% by weight of the fire retardant fibers.

9. The method of claim 1 further comprising the step of adding a dye to the fire retardant fibers.

10. The method of claim 1 further comprising the step of drying the fire retardant fibers after the fluffing step.

11. The method of claim 1 wherein the fire retardant fibers are dried down to a moisture content of about 14%.

12. The method of claim 1 wherein the one or more fiber feedstocks and the chemical are heated in the blend tank to a temperature of about 120° F.

13. The method of claim 12 wherein the one or more fiber feedstocks and the chemical are retained in the blend tank for about one hour.

14. The method of claim 1 further comprising the step of adding an enzyme to the blend tank to remove the bonding agent from the at least one of the one or more fiber feedstocks and thereby enhance the effective attachment of the combination of fire retardant chemicals on and into the basic structure of the one or more fiber feedstocks.

15. The method of claim 14 wherein the bonding agent has been removed by introducing the enzyme to the blend tank, wherein the enzyme is retained in the blend tank long enough to remove the bonding agent from the at least one of the one or more of the fiber feedstocks.

16. The method of claim 15 wherein the enzyme is an amylase enzyme.

17. The method of claim 15 wherein the bonding agent is one or more of a polysaccharide and a starch.

* * * * *